(12) United States Patent  
Nakamura et al.

(10) Patent No.: US 7,602,477 B2
(45) Date of Patent: Oct. 13, 2009

(54) RADAR DEVICE

(75) Inventors: Mitsuo Nakamura, Nagoya (JP); Katsuhiro Morikawa, Nagoya (JP)

(73) Assignee: Denso Corporation, Kariya (JP)

( * ) Notice: Subject to any disclaimer, the term of this patent is extended or adjusted under 35 U.S.C. 154(b) by 453 days.

(21) Appl. No.: 11/076,294

(22) Filed: Mar. 9, 2005

(65) Prior Publication Data

US 2005/0200833 A1    Sep. 15, 2005

(30) Foreign Application Priority Data

Mar. 10, 2004    (JP) ............................. 2004-067930

(51) Int. Cl.
*G01C 3/08* (2006.01)
*G01S 13/00* (2006.01)

(52) U.S. Cl. .................... 356/4.07; 356/4.01; 356/5.15; 342/27; 342/70

(58) Field of Classification Search ............... 342/70, 342/118, 27, 114, 115, 189, 195, 159; 701/45, 701/93, 8, 17, 301; 356/407, 28, 5.09, 5.15, 356/4.01; 340/435, 436
See application file for complete search history.

(56) References Cited

U.S. PATENT DOCUMENTS

| 3,614,626 | A | * | 10/1971 | Dillard | ....................... | 375/346 |
| 3,693,100 | A | * | 9/1972 | Brown et al. | ................... | 327/98 |
| 3,774,201 | A | * | 11/1973 | Collins | .................... | 324/76.24 |
| 3,936,749 | A | * | 2/1976 | Guillemin | ................... | 375/260 |
| 5,001,490 | A | * | 3/1991 | Fichtner | ...................... | 342/195 |
| 5,029,118 | A | * | 7/1991 | Nakajima et al. | ........... | 702/195 |
| 5,471,215 | A | * | 11/1995 | Fukuhara et al. | .............. | 342/70 |
| 5,565,870 | A | * | 10/1996 | Fukuhara et al. | .............. | 342/70 |
| 5,677,695 | A | * | 10/1997 | Suzuki et al. | ............... | 342/109 |

(Continued)

FOREIGN PATENT DOCUMENTS

JP    06-235765    8/1994

(Continued)

OTHER PUBLICATIONS

Office Action from the Japan Patent Office dated Jul. 15, 2008 for corresponding Japanese Patent Application 2004-067930, and English translation.

*Primary Examiner*—Isam Alsomiri
(74) *Attorney, Agent, or Firm*—Harness, Dickey & Pierce, PLC (57) ABSTRACT

A laser radar sensor includes a light emitting circuit, a light receiving circuit, an object detection circuit, and a CPU. The object detection circuit has a summation block, a noise reference determination block, a noise reference storing block, and a differentiation block. The summation block sums up photoreception signals outputted from a photoreceptor also included in the radar sensor and produces a summation signal. The noise reference determination block determines the summation signal outputted in a condition that no object is present in a detection area as a noise reference signal. The noise reference storing block stores the noise reference signal. The differentiation block calculates a subtraction signal by subtracting the noise reference signal from the summation signal for removing a noise component from the summation signal. Object detection is performed based on the subtraction signal. With this configuration, an object is properly detected even when a protection cover of the radar sensor has a dirty spot on its surface.

10 Claims, 10 Drawing Sheets

U.S. PATENT DOCUMENTS

| | | | | |
|---|---|---|---|---|
| 5,739,788 | A * | 4/1998 | Dybdal et al. | 342/359 |
| 5,786,788 | A * | 7/1998 | Schober et al. | 342/159 |
| 5,923,284 | A * | 7/1999 | Artis et al. | 342/129 |
| 6,121,915 | A * | 9/2000 | Cooper et al. | 342/70 |
| 6,169,485 | B1 * | 1/2001 | Campana, Jr. | 340/573.4 |
| 6,232,913 | B1 * | 5/2001 | Lehtinen | 342/137 |
| 6,420,995 | B1 * | 7/2002 | Richmond et al. | 342/45 |
| 6,526,394 | B2 * | 2/2003 | Baker et al. | 706/4 |
| 6,657,583 | B2 * | 12/2003 | Okamura | 342/135 |
| 6,744,399 | B2 * | 6/2004 | Tohyama et al. | 342/165 |
| 6,927,699 | B2 * | 8/2005 | Samukawa et al. | 340/903 |
| 7,075,315 | B2 * | 7/2006 | Tanaka | 324/642 |
| 2002/0084414 | A1 * | 7/2002 | Baker et al. | 250/336.1 |
| 2003/0090405 | A1 * | 5/2003 | Rauch et al. | 342/21 |
| 2004/0117090 | A1 * | 6/2004 | Samukawa et al. | 701/45 |
| 2004/0119634 | A1 * | 6/2004 | Samukawa et al. | 342/70 |
| 2004/0169840 | A1 | 9/2004 | Hoashi et al. | |
| 2004/0257556 | A1 * | 12/2004 | Samukawa et al. | 356/4.01 |
| 2005/0017891 | A1 * | 1/2005 | Kuroda et al. | 342/70 |
| 2005/0024257 | A1 * | 2/2005 | Britton et al. | 342/70 |
| 2005/0030220 | A1 * | 2/2005 | Nakamura et al. | 342/70 |
| 2005/0093735 | A1 * | 5/2005 | Samukawa et al. | 342/70 |
| 2005/0225439 | A1 * | 10/2005 | Watanabe et al. | 340/435 |
| 2005/0264438 | A1 * | 12/2005 | Fullerton et al. | 342/28 |
| 2006/0072099 | A1 * | 4/2006 | Hoashi | 356/4.01 |
| 2006/0262290 | A1 * | 11/2006 | Yamaguchi | 356/4.01 |

FOREIGN PATENT DOCUMENTS

| | | |
|---|---|---|
| JP | 07-151852 | 6/1995 |
| JP | 10-268031 | 10/1998 |
| JP | 2001-166035 | 6/2001 |
| JP | 2001-166043 | 6/2001 |
| JP | 2002-040139 | 2/2002 |
| JP | 2003-215237 | 7/2003 |

* cited by examiner

LINE 1 | 0 | 1 | 2 | ..... | 25 | 26 |
LINE 2 | 0 | 1 | 2 | ..... | 25 | 26 |
LINE 3 | 0 | 1 | 2 | ..... | 25 | 26 |
⋮
LINE 327−RANGE+1 | 0 | 1 | 2 | ..... | 25 | 26 |

FIG. 11

LINE 1 | 0 | 1 | 2 | ..... | 25 | 26 |
LINE 2 | 0 | 1 | 2 | ..... | 25 | 26 |
LINE 3 | 0 | 1 | 2 | ..... | 25 | 26 |
⋮
LINE 327−RANGE+1 | 0 | 1 | 2 | ..... | 25 | 26 |

RADAR DEVICE

CROSS REFERENCE TO RELATED APPLICATION

This application is based on and incorporates herein by reference Japanese Patent Application No. 2004-67930 filed on Mar. 10, 2004.

FIELD OF THE INVENTION

The present invention relates to a radar device.

BACKGROUND OF THE INVENTION

A vehicular radar device that detects an object ahead of a vehicle is proposed in JP-A-2002-40139. The radar device emits light waves or millimeter waves forward and detects an object based on reflected waves. This kind of radar device is used in a warning system that provides a warning when the vehicle becomes close to an object in front, such as a vehicle in front. It is also used in a speed control system that controls a vehicle speed to maintain a predetermined distance to a vehicle in front.

In the radar device, a laser diode emits laser beams as outgoing waves. The laser beams are reflected with a rotating polygon mirror. Multiple laser beams are emitted in a predetermined range with predetermined horizontal and vertical limits. The laser beams reflected by an object are received by the radar device through a light sensitive lens. The received reflected beams are guided to a light sensitive element. The light sensitive element outputs an electrical signal indicating light levels. The radar device determines a distance to the object based on the time when the electrical signal reaches a predetermined voltage after the laser beam is emitted. It also determines horizontal and vertical positions of the object based on an emission angle of the laser beam.

A protection cover, such as a glass plate or resin plate, are attached to laser beam emitting and receiving surfaces to protect light emitting element and the light sensitive element. The laser beams may be scattered when the protection cover has a dirty spot, and some of scattered laser beams may be received by the light sensitive element. As a result, performance of the radar device decreases.

Moreover, the received scattered laser beams may become noise components in object detection. Thus, object detection performance greatly decreases when the protection cover has a dirty spot.

SUMMARY OF THE INVENTION

The present invention therefore has an objective to provide a radar device that properly detects an object is properly based on a photoreception signal even when a protection cover of a laser radar sensor has a dirty spot on its surface. A radar device of the present invention includes radar means, determination means, storing means, differentiation means, and object detection means.

The radar means emits an outgoing wave in a predetermined detection area, and outputs a reception signal according to intensity of a reflected wave of the outgoing wave. The radar means outputs the reception signal when the outgoing wave is reflected by an object and enters the radar means. The determination means determines a condition in which no object is present in the detection area. The storing means stores a noise reception signal when the condition in which no object is present in the detection area is determined and the outgoing wave is emitted by the radar means. The noise reception signal corresponds to a noise outputted from the radar means in association with emission of the outgoing wave by the radar means.

The differentiation means calculates a subtraction signal by subtracting the noise reception signal stored by the storing means from the reception signal outputted by the radar means. The object detection means compares the subtraction signal with a predetermined reference value, and detects the object reflecting the outgoing wave based on the subtraction signal equal to or larger than the reference value.

The outgoing wave may be reflected by a dirty spot on a surface of the radar means if the surface becomes dirty and received by the radar means. This decreases performance of the radar device in the object detection. The radar device stores the noise reception signal that indicates a level of noise component including a noise due to the reflection by the dirty spot, and subtracts the noise reception signal from the reception signal during the object detection.

The reception signal indicates a level of noises when no object is present in the detection area. Therefore, the storing means stores the reception signal as a noise reception signal when no object is present in the detection area and the outgoing wave is emitted by the radar means. The noise reception signal is subtracted from the reception signal during the object detection and the noise component is removed. As a result, the object is properly detected, namely, the performance of the radar device in the object detection is not reduced even when a dirty spot is present on the surface of the radar means.

BRIEF DESCRIPTION OF THE DRAWINGS

The above and other objectives, features and advantages of the present invention will become more apparent from the following detailed description made with reference to the accompanying drawings. In the drawings.

DETAILED DESCRIPTION OF THE PREFERRED EMBODIMENT

The preferred embodiments of the present invention will be explained with reference to the accompanying drawings. In the drawings, the same numerals are used for the same components and devices.

Figure 1:
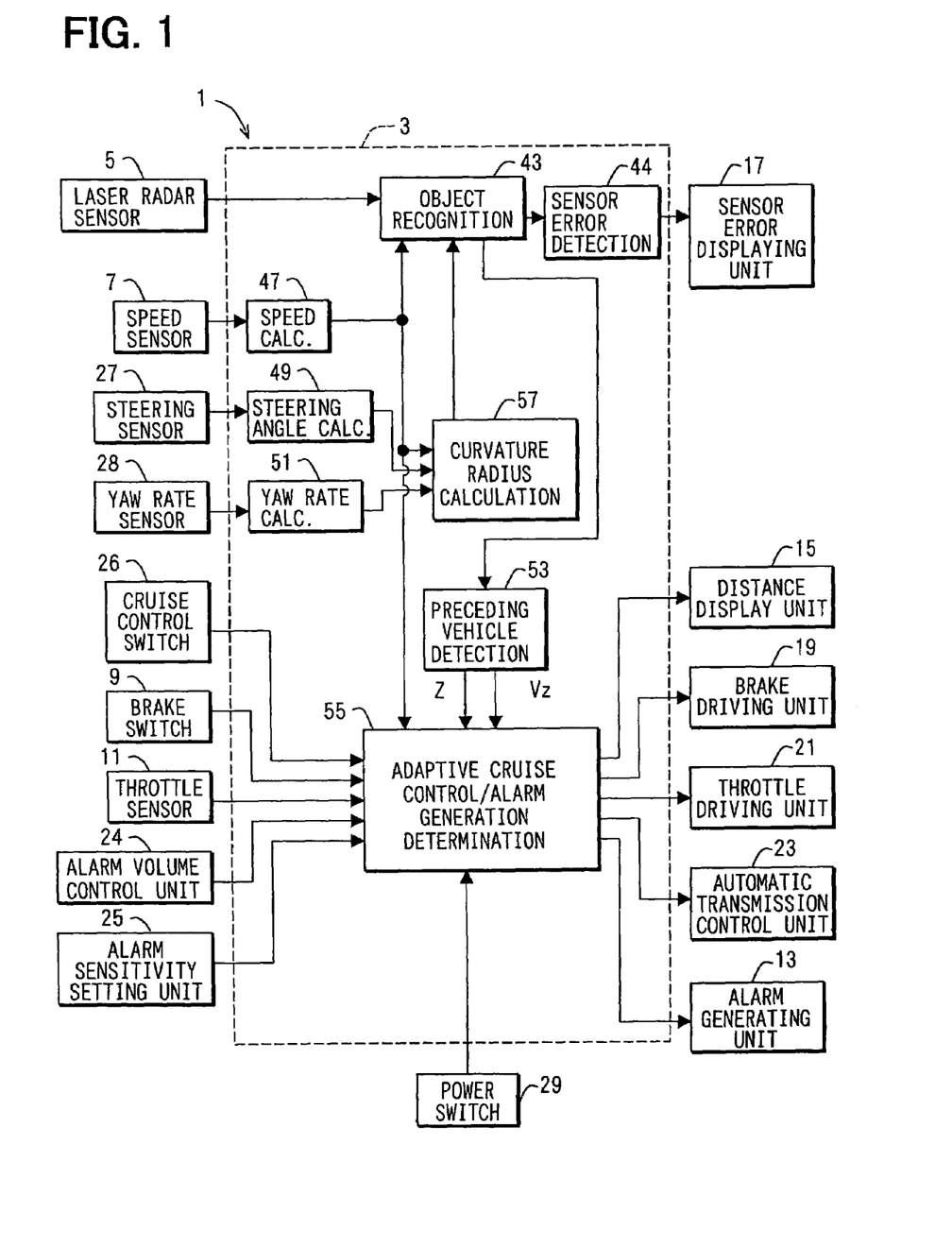
FIG. 1 is a block diagram of a vehicular control system in which a laser radar sensor is installed according to an embodiment of the present invention.

Referring to FIG. 1, a vehicle control system 1 includes an object recognition and cruise control electronic control unit (ECU) 3. The ECU 3 has a microcomputer as a main component, and has an input and output interface (I/O) and various driving and detection circuits.

The ECU 3 receives signals from a laser radar sensor 5, a speed sensor 7, a brake switch 9, and a throttle sensor 11. The radar sensor 5 is a radar device. The ECU 3 outputs driving signals to an alarm generating unit 13, a distance displaying unit 15, a sensor error displaying unit 17, a brake actuating unit 19, a throttle actuating unit 21, and an automatic transmission control unit 23.

An alarm volume control unit 24, an alarm sensitivity setting unit 25, a cruise control switch 26, a steering sensor 27, and a yaw rate sensor 28 are connected to the ECU 3. The alarm volume control unit 24 controls a volume of an alarm sound. The alarm sensitivity setting unit 25 controls sensitivity in an alarm determination process. The steering sensor 27 detects a variation in a steering wheel angle. The yaw rate sensor 28 detects a yaw rate of a vehicle. The ECU 3 has a power switch 29 and starts control processes when the power switch 29 is turned on.

Figure 2A:
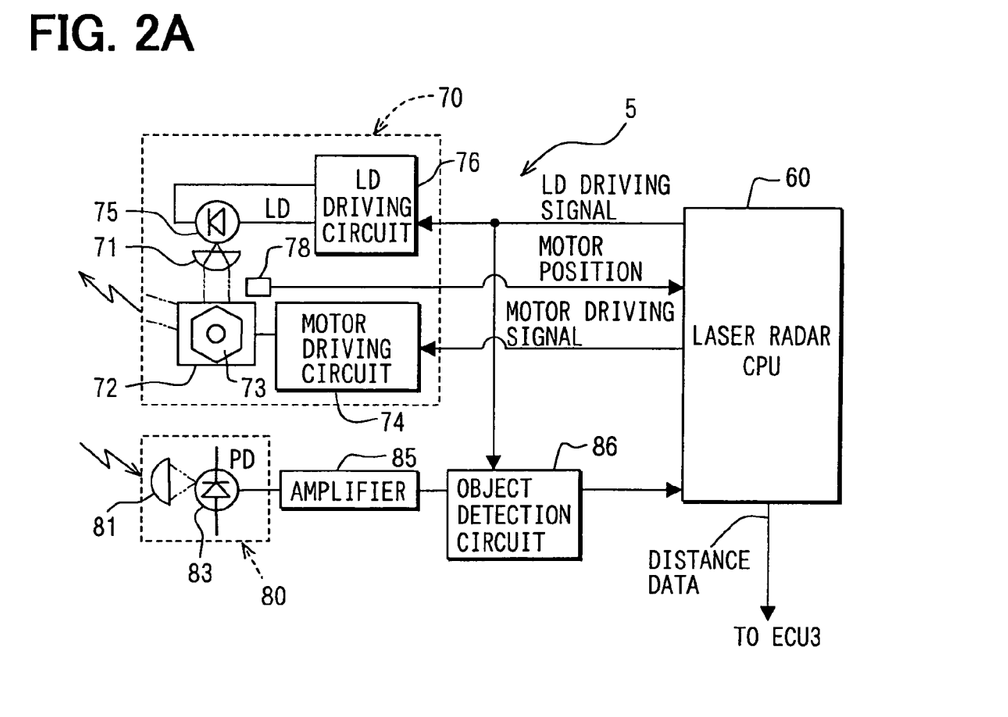
FIG. 2A is a block diagram of the radar sensor according to the embodiment.

Referring to FIG. 2A, the radar sensor 5 includes a light emitting circuit 70, a light receiving circuit 80, and a laser radar CPU 60. The light emitting circuit 70 has a semiconductor laser diode (LD) 75 that emits laser pulses via a light emitting lens 71 and a scanner 72. The laser diode 75 is connected to the CPU 60 via the laser diode driving circuit 76.

The laser diode 75 emits laser beams (outgoing waves) according to driving signals from the CPU 60. The scanner 72 has a polygon mirror 73 arranged rotatable around its vertical axis. The polygon mirror 73 is rotated by a motor (not shown) when a driving signal is inputted. A rotation position of the motor is detected by a motor rotation position sensor 78 and inputted to the CPU 60.

Figure 3:
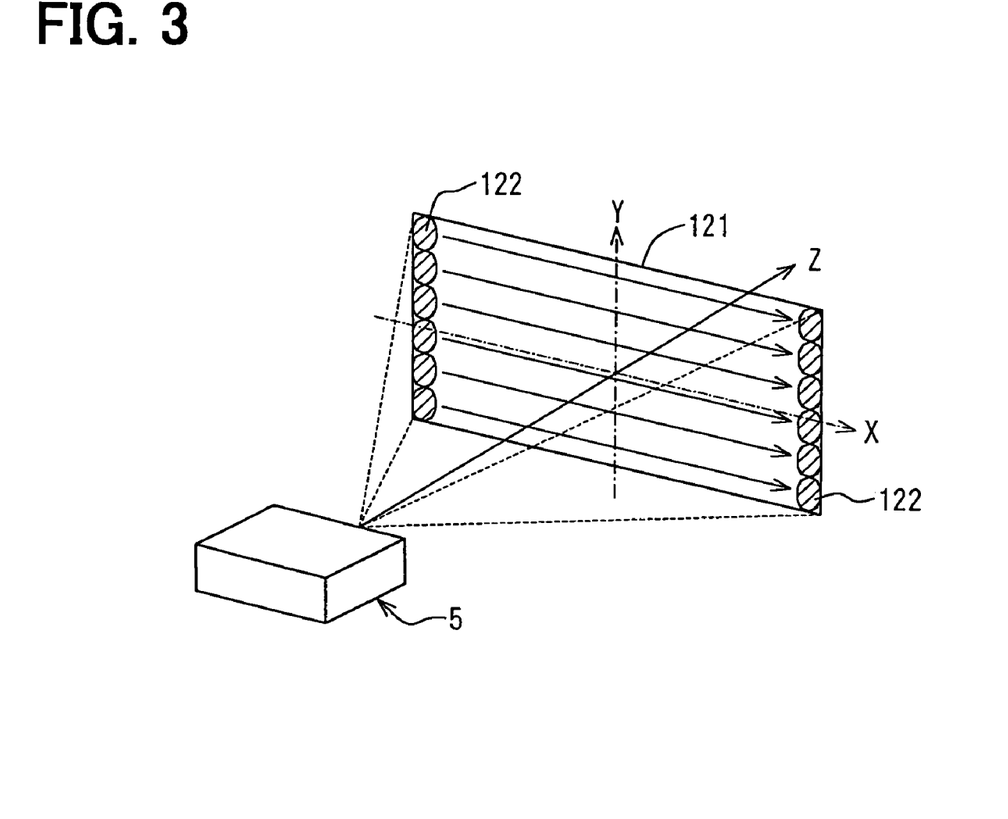
FIG. 3 is a perspective view of the radar sensor and its scan area according to the embodiment.

The polygon mirror 73 has six mirror faces arranged at different angles. Thus, the laser beams are outputted such that an area within predetermined angles in the horizontal and vertical directions is scanned with random laser beams. A method of the scanning will be discussed referring to FIG. 3. FIG. 3 shows laser beam patterns 122 in the case that the laser beams are emitted on right and left edges of a scan area (detection area) 121 and it does not show the patterns in the case that the laser beams are emitted in an area between the edges.

The emitted laser beam patterns 122 are shown substantially in an oval although they may be in a rectangular. Electric waves, such as millimeter waves, or ultra sonic waves can be used instead of the laser beams. The object detection is not limited to the scanning and any other method for determining two points in addition to a distance can be used.

The laser beams are emitted to the scan area 121 in the Z direction such that the X-Y plane is scanned in sequence. The Y-axis is aligned in the reference direction, which is equal to the vertical direction of the vehicle. The X-axis is aligned in the scanning direction, which is the side-to-side direction of the vehicle. The laser beams are emitted at 372 points in the X-axis direction by shifting a predetermined angle. The 372 point-emission of the laser beams in the X-axis direction is repeated for six scanning lines apart from each other in the Y-axis direction. Multiple laser beams are emitted in each scanning line of the first through the sixth scanning lines.

The laser beams are emitted in the scan area 121 and the reflected laser beams are received by the radar sensor 5. The CPU 60 calculates scan angles $.sub."x$ and $.sub."y$ that indicate emission angles of the laser beams and a distance L. Then, it outputs the scan angles, $.sub."x$, $sub."y$ and the distance L to the ECU 3. The scan angle $.sub."x$ is determined as a horizontal scan angle between a line of the laser beam on the X-Z plane and the Z axis. The scan angle $.sub."y$ is determined as a vertical scan angle between a line of the laser beam on the Y-Z plane and the Z axis.

The light receiving circuit 80 of the radar sensor 5 includes a condenser lens 81 that collects the laser beams reflected by an object (not shown) and the photoreceptor (photo diode) 83 that outputs electrical signals (photoreception signals) indicating levels of the collected laser beams. The photoreception signals outputted by the photoreceptor 83 are amplified by an amplifier 85. The predetermined number of the photoreception signals is summed in an object detection circuit 86. The object detection circuit 86 detects an object based on a summation signal that is produced according to a result of the summation.

Figure 2B:
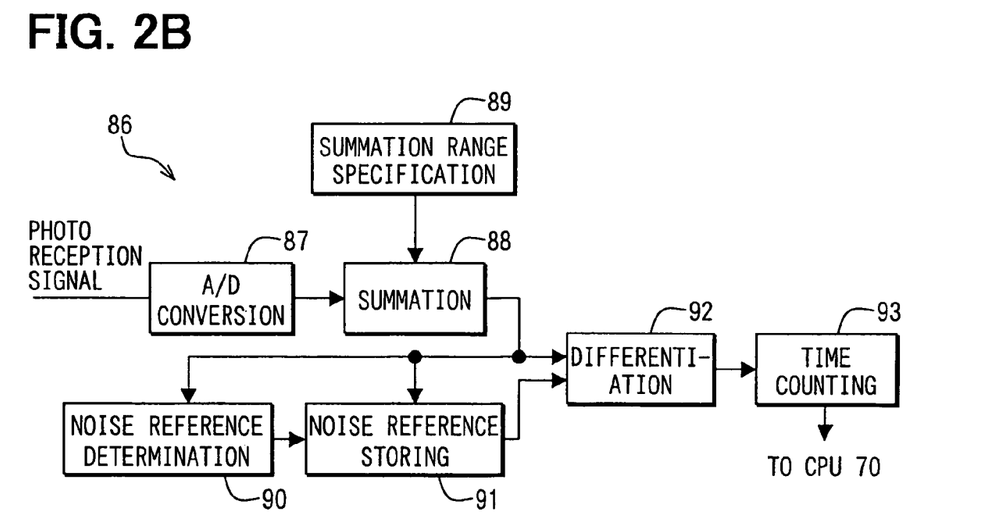
FIG. 2B is a block diagram of an object detection circuit included in the radar sensor according to the embodiment.
Figure 4:
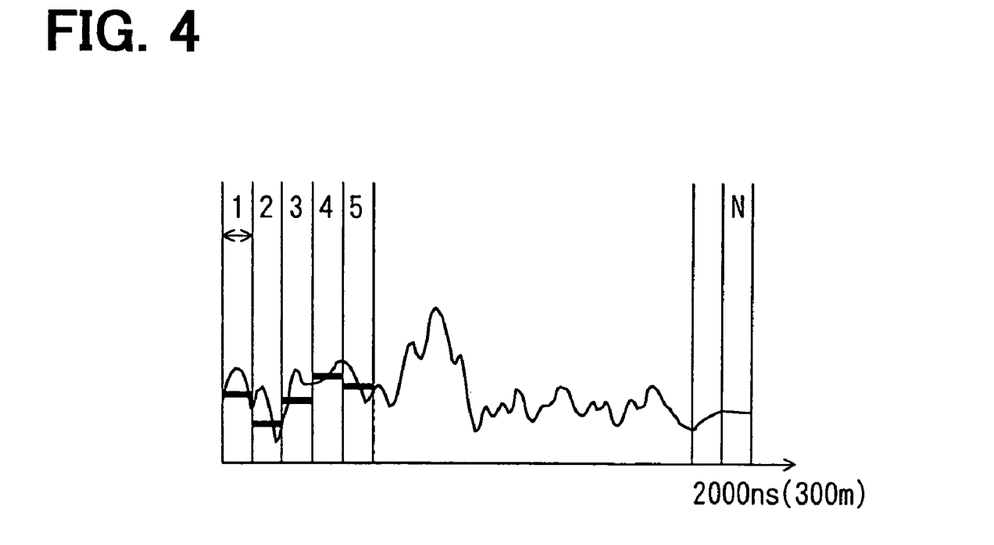
FIG. 4 is a waveform of a photoreception signal showing a process of analog to digital conversion performed in a analog-to-digital conversion block according to the embodiment.

The object detection circuit 86 includes an analog-to-digital (A/D) conversion block 87 as shown in FIG. 2B. Each photoreception signal outputted from the amplifier 85 is inputted to the A/D conversion block 87 and converted into a digital signal. The digital signal is inputted to a summation block 88 and temporarily stored. The photoreception signals converted into the digital signals are signals outputted from the amplifier 85 for a predetermined period, for instance 2000 ns, since the emission of the laser beams. The A/D conversion block 87 divides the photoreception signals into N sections by a predetermined period, for instance 25 ns. Then, it converts an average of the photoreception signal in each section into a digital value.

A summation range specification block 89 specifies a range for the summation. It selects a predetermined number of the photoreception signals that indicate the laser beams emitted adjacent to each other in the X-axis direction from the photoreception signals stored in the summation block 88, and determined the range. The summation block 88 sums up the photoreception signals in the specified range and produces the summation signal (summed photoreception signal).

Figure 5:
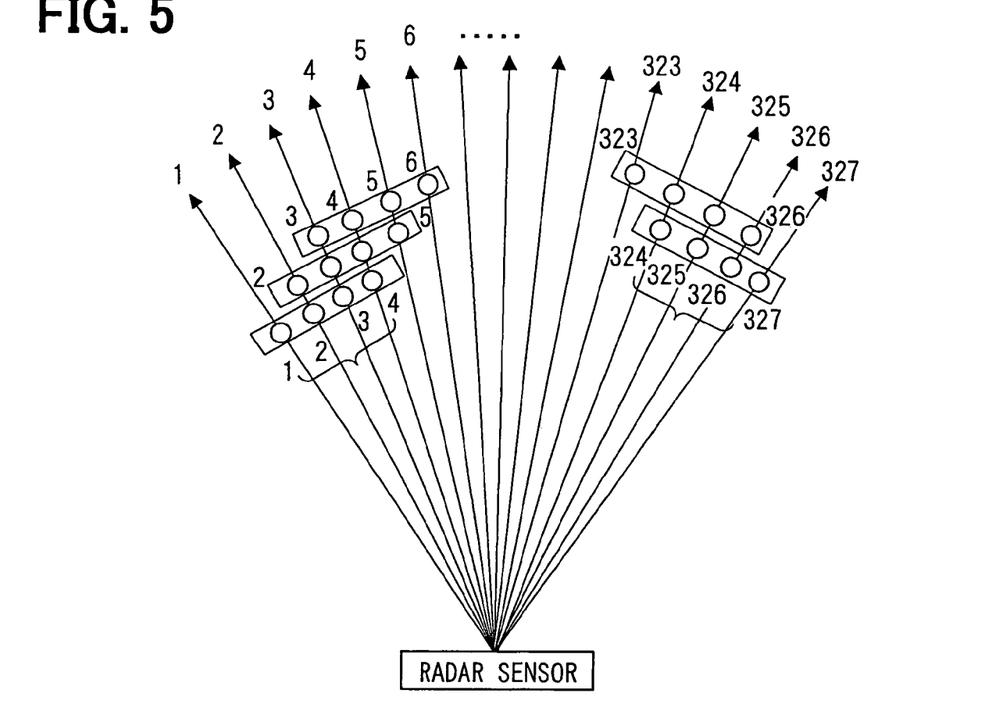
FIG. 5 is a schematic diagram of laser beams and summation ranges according to the embodiment.

A schematic view of the photoreception signals is shown in FIG. 5. The laser beams are emitted in the scan area 121 with a predetermined angle shifted from each other. Each laser beam and each photoreception signal are marked with a beam number and a scan number, respectively. The range is determined such that four photoreception signals are included in the range. Only one scan line of laser beams is shown in FIG. 5 for a purpose of simplification.

Each vehicle has a reflector on its rear surface that reflects laser beams with at high intensity and a body of the vehicle also has high reflection intensity although it is not as high as the reflector. Detection of a vehicle in front is possible based on a reflected laser beam from the vehicle since the intensity of the reflected laser beam is high. However, the intensity of the laser beam may decrease if the rear surface of the vehicle is covered with soil or snow, that is, the rear surface becomes dirty. In this case, the vehicle may not be properly detected based on a single photoreception signal.

In this embodiment, the photoreception signals are summed and amplified for detecting the reflected laser beams with low intensity. The summation range specification block 89 specifies the photoreception signals to be summed. It specifies the predetermined number of the photoreception signals indicating the laser beams emitted adjacent to each other in the same scan line, or the same plane, as the photoreception signals to be summed. More specifically, it specifies the photoreception signals with scan numbers 1 through 4 as line 1, and the photoreception signals with scan numbers 2 through 5 that are one photoreception signal shifted from the line 1 as line 2. In the same manner, it specifies lines 3 through 324, each of which includes four photoreception signals indicating four adjacent laser beams.

Figure 6:
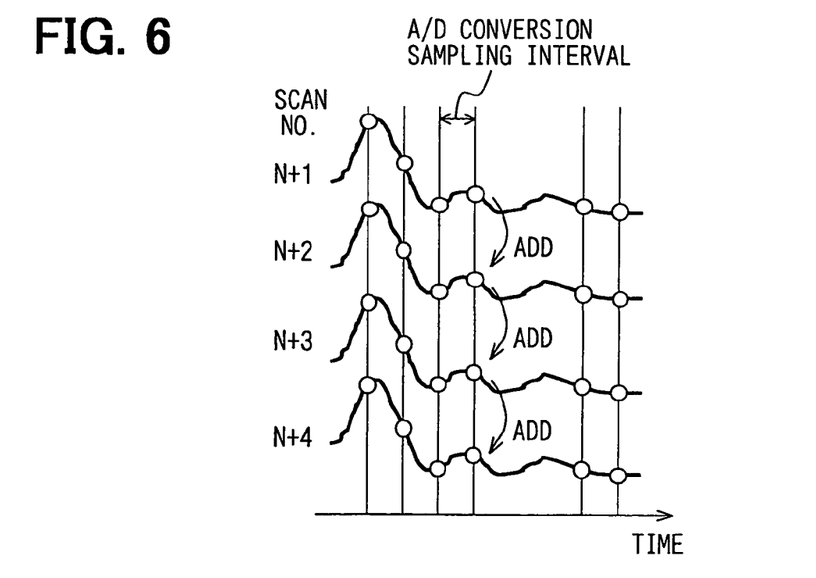
FIG. 6 is an explanatory diagram for showing a process of photoreception signal summation according to the embodiment.

The summation block 88 outputs summation signals that are sums of the photoreception signals in the specified range in synchronization with the specification of the summation ranges. The summation is a process for summing all the digital values of four photoreception signals at a single time as shown in FIG. 6. A signal-to-noise (S/N) ratio is improved by summing the predetermined number of the photoreception signals.

Figure 7:
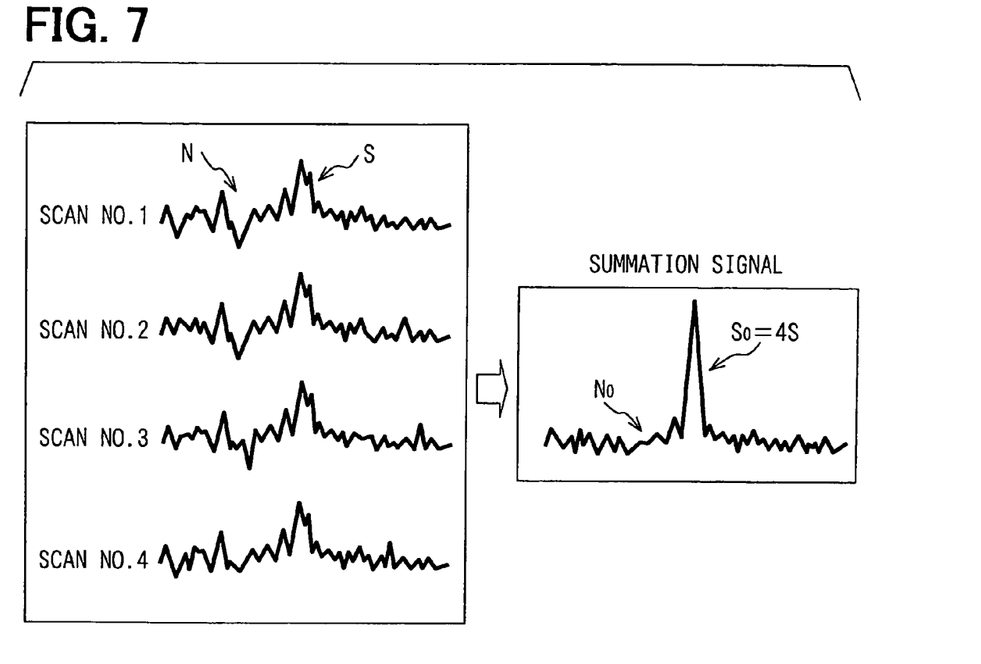
FIG. 7 is an explanatory diagram for showing differences in the photoreception signals and the summation signal according to the embodiment.

If all four photoreception signals contain photoreception signal components S corresponding to reflected light beams from the same object, the photoreception signal components S appear at the same time elapsed since the emission of the laser beams as shown in FIG. 7. Therefore, amplitude of the photoreception signal component S0 of the summation signal is four time higher than that of the photoreception signal component S of each photoreception signal. A noise component N included in each photoreception signal randomly appears based on extraneous light. Thus, the amplification of a noise component N0 of the summation signal is lower than that of the photoreception signal component S0 even when four photoreception signals are summed. Namely, the S/N ratio of the photoreception signal S0 and the noise component N0 can be improved by calculating the summation signal by the summation block 88. As a result, an object is properly detected based on the amplified photoreception signal component S0 even when the photoreception signal component S of each photoreception signal is small and hard to distinguish from the noise component N.

The summation range specification block 89 shifts the range by one photoreception signal. With this configuration, the resolution of the detection based on the summation signal is maintained as the summation of four photoreception signals is performed. When the photoreception signals are separated into groups, each of which has four photoreception signals, and the summation signal is calculated for each group, the sensitivity of the reflected laser beam detection can be improved. However, the resolution of the detection is greatly reduced. The reduction in the detection resolution is less likely to occur when the ranges of the photoreception signals to be summed are shifted by one photoreception signal.

The summation range is not limited to four. The summation range, that is, the number of the reception signals can be determined according to a size of an object, an angle between adjacent laser beams, and the maximum detectable distance.

The noise reference determination block 90 receives the summation signal from the summation block 88 and determines a condition in which no object is present in the scan area 121. A spike appears in the photoreception signal if an object is present in the scan area even when the intensity of the reflected laser beam is low because the photoreception signal component S is amplified. Namely, the noise reference determination block 90 determines the condition in which no object is present if no spike, which corresponds to the photoreception signal component S0 appears in the summation signal.

Scattered laser beams may be received when the protection cover of the radar sensor 5 is dirty and the laser beams are scattered by dirty spots. In this case, spikes appear in the summation signal during the predetermined period since the emission of the laser beam. The noise reference determination block 90 determines a condition in which no object is present in the scan area 121 when the summation signal does not contain clearly distinguishable spikes during the predetermined period since the emission of the laser beam. The object detection can be performed with an image sensor and an image processing device for higher accuracy.

The noise reference determination block 90 outputs a permission signal to the noise reference storing block 91 when the condition in which no object is present in the scan area 121 is determined. The noise reference storing block 91 stores the summation signal outputted from the summation block 88 for each range based on the permission signal. The noise reference determination block 90 may be configured to determine whether the summation signal contains the photoreception signal component S0 for each summation signal and output the permission signal to the noise reference storing block 91 for summation signal that does not contain the photoreception signal component. Alternatively, it may be configured to output the permission for storing summation signals in all ranges when it determines that all summation signals do not contain the photoreception signal component S0.

The photoreception signals do not contain the photoreception components S when no object is present in the scan area 121. Therefore, the summation signal indicates the noise components N, resulted from various causes, of the photoreception signals. The noise components N are stored in the noise reference storing block 91 as noise reference signals and removed from the summation signal by a differentiation block 92. As a result, the S/N ration of the summation signal is further improved.

The noise components N include pattern noises produced by scattered laser beams, clock pulses of the CPU 60, and electromagnetic noises. The laser beam is scattered with dirty spots on the protection cover and the scattered laser beams create noises when received in the radar sensor 5. The electromagnetic noise is produced during emission of the laser beams. The pattern noises are amplified during the calculation of the summation signal. The noise components N including the pattern noises are stored as noise reference signals and removed from the summation signal. With this process, the noise components N are properly removed form the summation signal.

Figure 8:
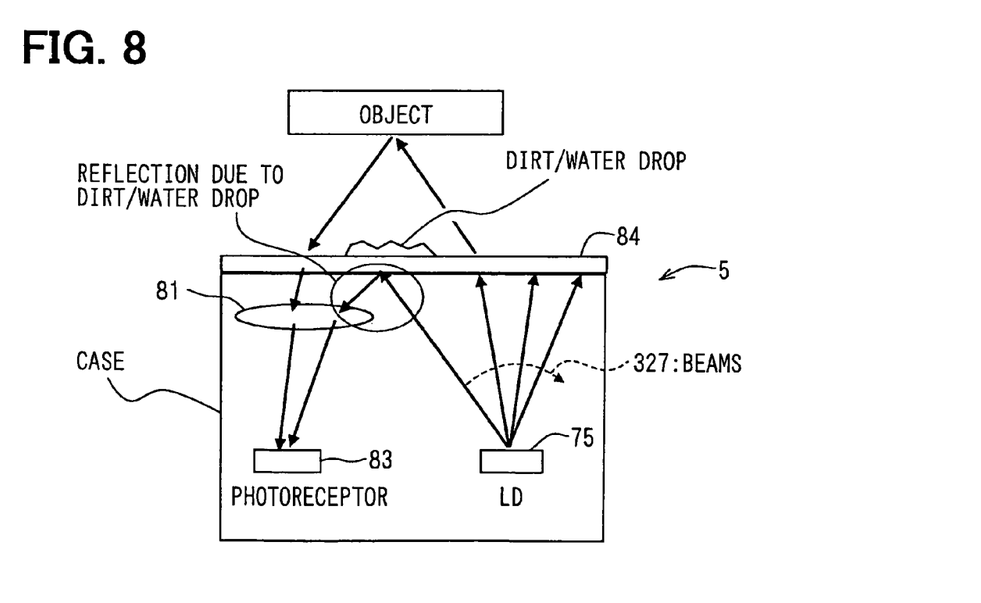
FIG. 8 is an explanatory diagram for showing an influence of a dirty spot on a protection cover on laser beams according to the embodiment.

Referring to FIG. 8, the protection cover 84 is attached to a surface of the radar sensor 5 for protecting the laser diode 75 and the photoreceptor 83. The protection cover 84 is a glass plate or a resin plate. The laser beams are scattered by dirty spots on the protection cover 84 when soil, water drops, snow or other foreign substances adhere to the protection cover 84. Some of the scattered laser beams may be received by the photoreceptor 83 and become noises to the photoreception signal components S. Namely, the scattered laser beams may be a cause of reduction in the object detection performance.

Figure 9A:
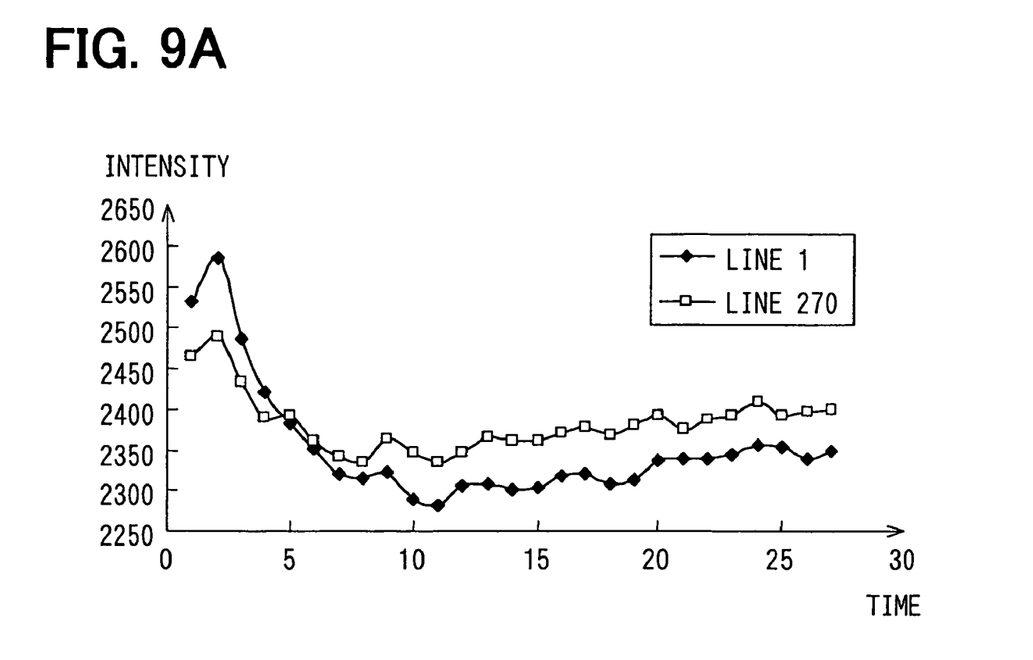
FIG. 9A is waveforms of summation signal produced in conditions that no object is present in the scan area and a dirty spot is present on the protection cover according to the embodiment.
Figure 9B:
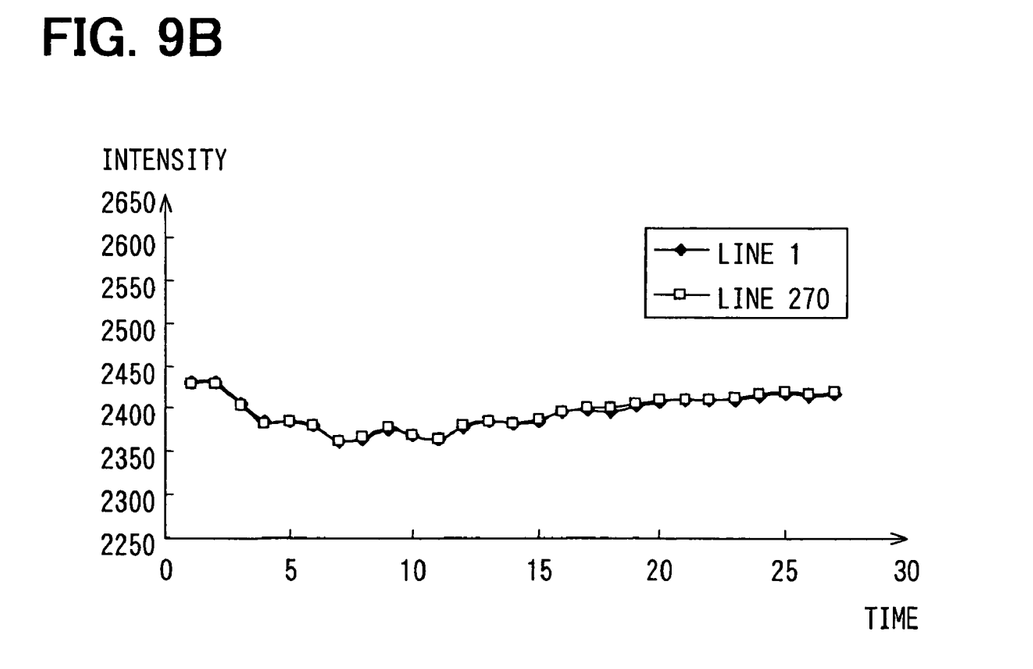
FIG. 9B is waveforms of summation signal produced in conditions that no object is present in the scan area and no dirty spot is present on the protection cover according to the embodiment.

Influences of the dirty spots to the summation signals are shown in FIGS. 9A and 9B. The summation signals shown in FIGS. 9A and 9B are measured in a condition that no object is present. The summation signals of FIG. 9A are measured in a condition that the protection cover 84 has dirty spots and the summation signals of FIG. 9B are measured in a condition that the protection cover 84 does not have dirty spots. The summation photoreception signal range is set to twenty. Line 1 is a summation signal produced by summing the photoreception signals with scan numbers 1 through 20 and line 270 is a summation signal produced by summing the photoreception signals with scan numbers 270 through 289. The X-axes are time (unit: 25 ns) and the Y-axes are unit proportional to the intensity of the receipt signals. 27 samples converted from analog signals to digital signals at intervals of 25 ns are shown.

The intensity of the summation signals largely varies from time to time when the protection cover 84 has dirty spots in comparison to the case that the protection cover 84 does not have dirty spots. Peaks appear between time 0 and time 5 are produced by the laser beams reflected by the dirty spots. Moreover, the intensity of the line 1 summation signal and that of the line 270 summation signal are different from each other. Emission positions or incidence angles of laser beams to the dirty spots on the protection cover 84 are different in line 1 and line 270. Thus, the laser beams differently scattered and the intensity varies. The intensity is about the same in line 1 and line 270 when the protection cover 84 does not have dirty spots.

Figure 10:
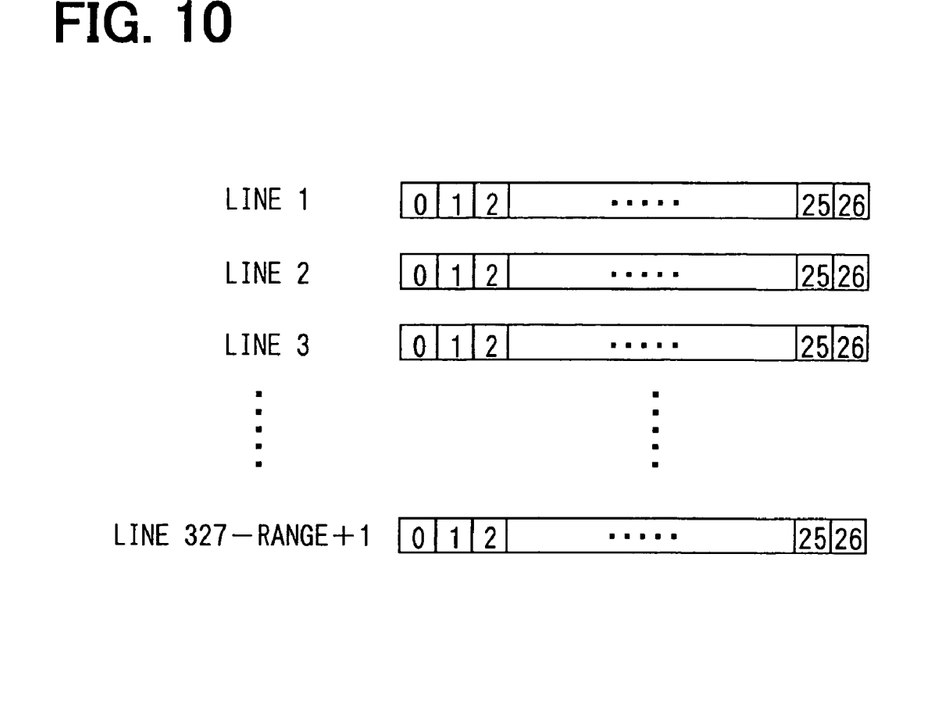
FIG. 10 is an explanatory diagram for showing data structures of the noise reference signal according to the embodiment.

The intensity of the summation signals varies when the ranges of the summation signals are different when the protection cover 84 has dirty spots. Therefore, the noise reference storing block 91 stores the summation signals for each summation signal range. Structures of noise reference data stored in the noise reference storing block 91 are shown in FIG. 10.

The summation signals of lines 1 through line n are separately stored in the noise reference storing block 91. Line number n is calculated by the following equation: n=327−the summation signal range+1. Each line has twenty-seven pieces of digital data in FIG. 10. The number of pieces of the digital data may be altered according to a distance to an object.

The dirty spots on the protection cover 84 may come off during traveling or cleaning. Namely, a condition on the surface of the protection cover 84 continuously varies. Thus, the noise reference signals stored in the noise reference storing block 91 are required to be updated to values corresponding to the most recent condition. The noise reference determination block 90 outputs the permission signal to the noise reference storing block 91 whenever it determined the condition that no object is present in the scan area 121 for updating the noise reference signals.

The noise reference signal stored in the noise reference storing block 91 is passed to the differentiation block 92. The differentiation block 92 calculates a subtraction signal by subtracting the noise reference signal from the summation signal.

Figure 11:
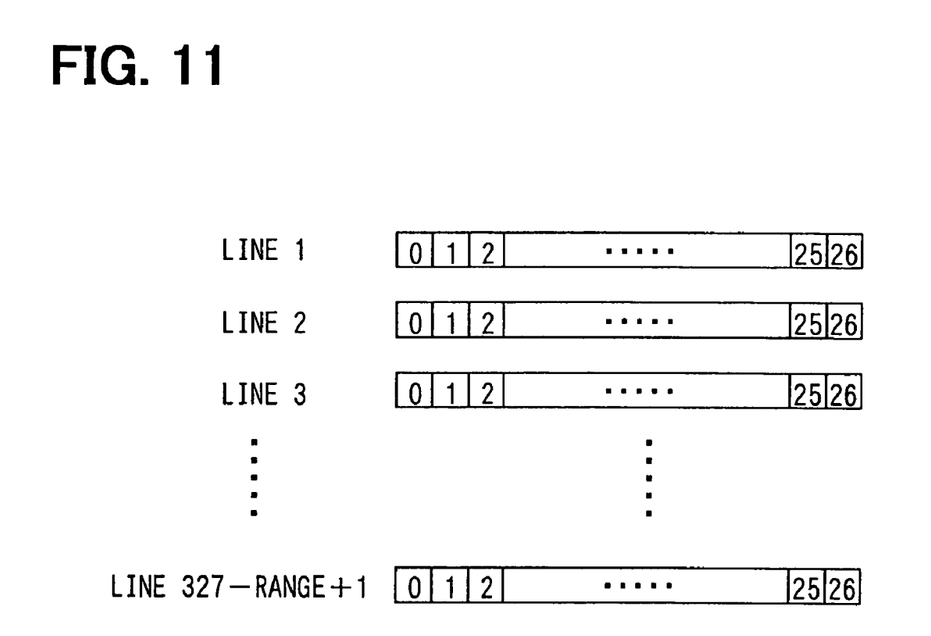
FIG. 11 is an explanatory diagram for showing data structures of the summation signal according to the embodiment.

Structures of the summation signals are shown in FIG. 11. The summation block 88 outputs the summation signals of lines 1 through n in sequence. The noise reference storing block 91 outputs the noise reference signal of lines 1 through n in sequence so that the noise reference signals are outputted in response to the output of the summation signals in the same ranges.

The noise reference signals are different from the summation signal range to the summation signal range when the protection cover 84 has dirty spots. Thus, the summation signals and the noise reference signal in the same summation signal range are used for subtracting the noise reference signal from the summation signal. The noise component is properly removed from the summation signal by using the summation signals and the noise reference signal in the same summation signal range.

Figure 12:
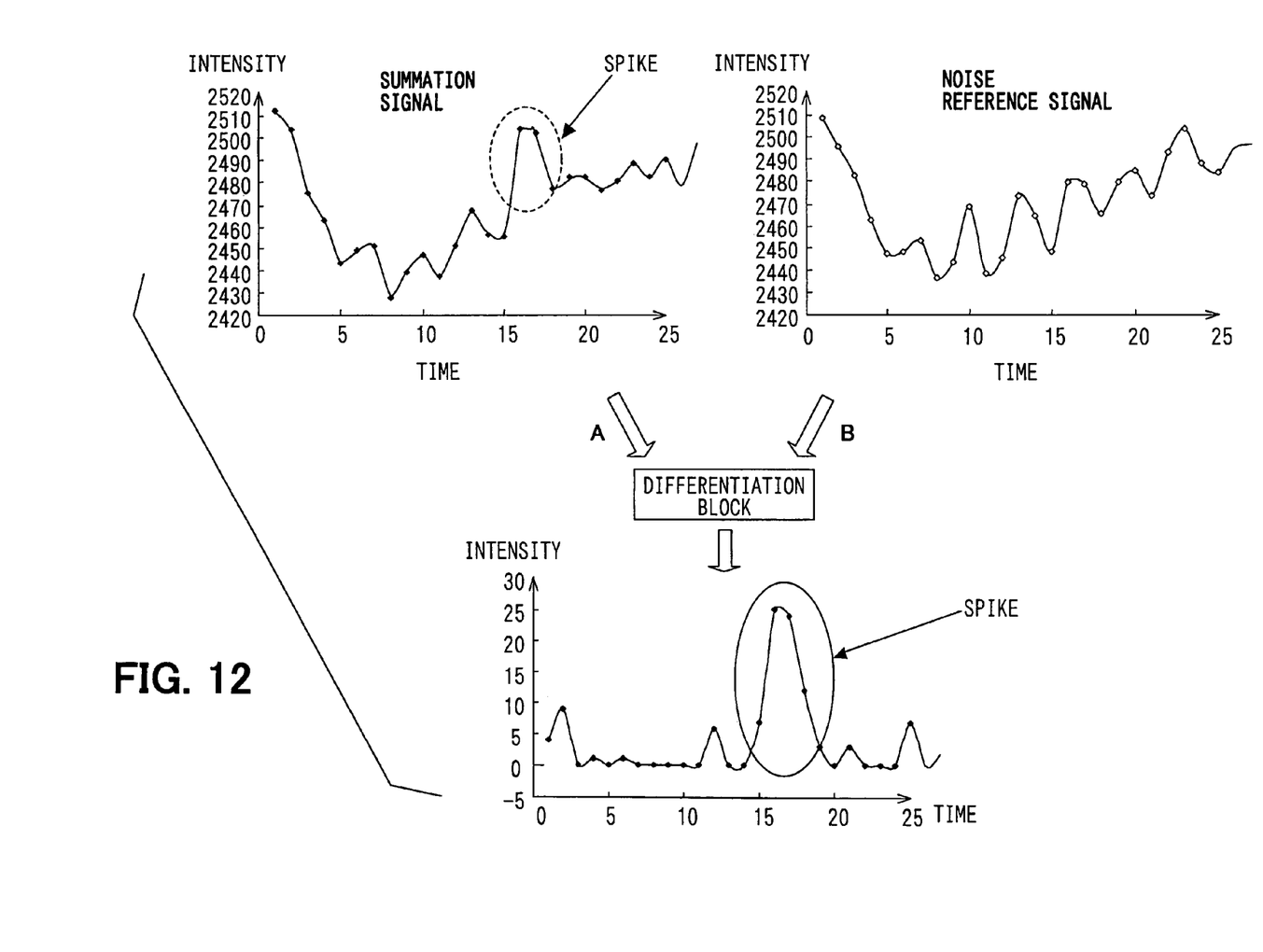
FIG. 12 is an explanatory diagram showing a differentiation process according to the embodiment.

The summation signal, the noise reference signal, and the subtraction signal that is produced through the differentiation (subtraction) process in the differentiation block 92 are shown in FIG. 12. The photoreception signal component S of the reflected laser beam from an object and extracted through the differentiation process is hereinafter referred to as a spike.

In the differentiation process, data of the noise reference signal is subtracted from the data of the summation signal. The data at the corresponding time is used for the subtraction. The result of the summation is stored if the data of the summation signal is larger than that of the noise reference signal. If the data of the summation signal is smaller than that of the noise reference signal, that is the result of the summation is a negative value, the subtraction result is set to zero. The spike is extracted by performing such a subtraction for each summation signal data and the noise reference signal data.

The subtraction signal is passed to the time counting block 93. The time counting block 93 determines whether the spike is present in the subtraction signal. More specifically, it sets a threshold and determines the presence of the spike if a value larger than the threshold exists in the subtraction signal. It sets different thresholds for different summation signal ranges. If the summation range is sixteen, the level of the summation signal is 16/4=4 times larger than that of the summation signal in the summation range of four. Thus, the threshold is required to be set at different values for different summation signal ranges.

However, the threshold is set with a margin for reducing erroneous detection in the case that the threshold is constant. Therefore, the peak may not be detected even when the peak is actually present. For example, the subtraction signal having the spike higher than the threshold shown in FIG. 13A can be detected but the subtraction signal having the spike lower than the threshold shown in FIG. 13B cannot be detected.

Figures 13A, 13B, 14A:
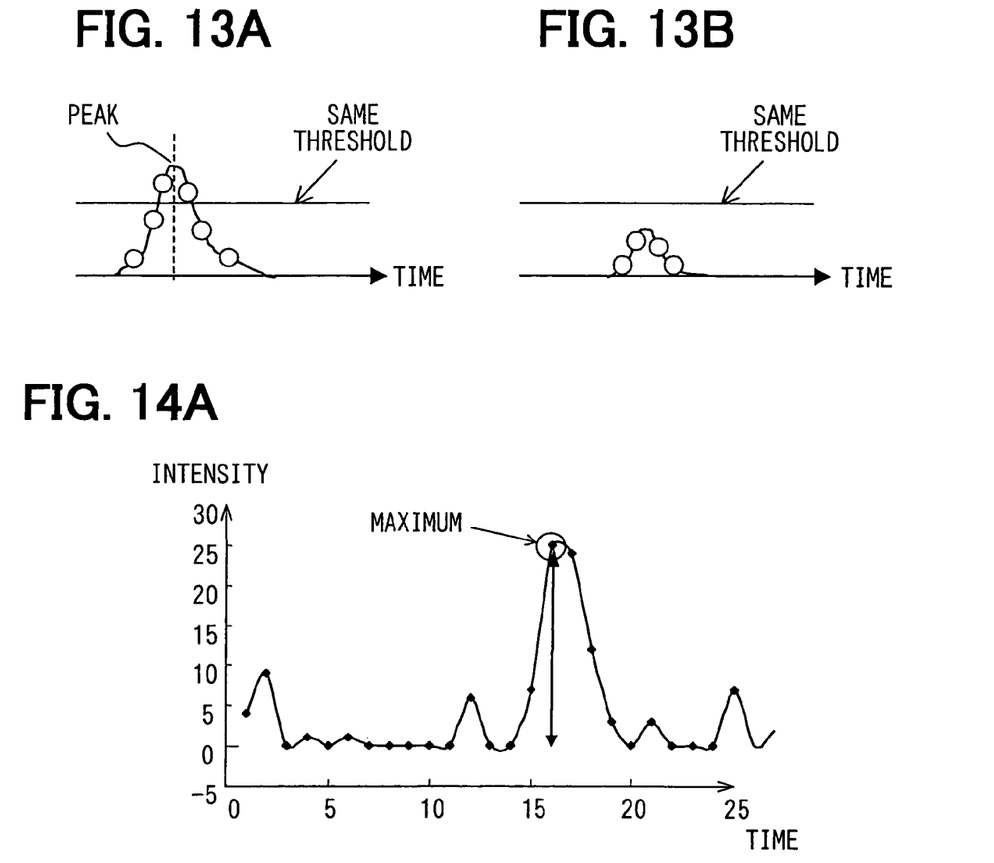
FIG. 13A is a waveform of a subtraction signal according to the embodiment.
FIG. 13B is a waveform of a subtraction signal according to the embodiment.
FIG. 14A is an explanatory diagram showing a threshold setting process according to the embodiment.
Figure 14B:
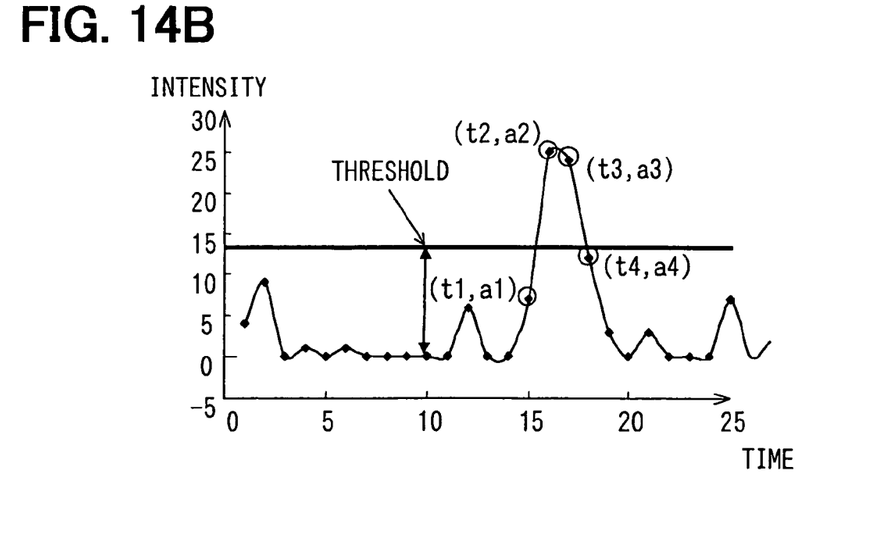
FIG. 14B is an explanatory diagram showing a spike appearance time calculating process according to the embodiment.

Referring to FIGS. 14A and 14B, the threshold is set by detecting the maximum value of the spike data (A/D converted value) and multiplying the maximum value by a predetermined coefficient k. The coefficient k is a constant value equal to or smaller than 1, for instance, 0.5. By setting the threshold with this method, the spike is properly detected based on the threshold as long as the spike is present regardless of the maximum intensity of the spike. The threshold is set for each subtraction signal. Namely, the threshold is automatically set to a proper value in response to a variation in the maximum value of the spike or an alteration of the summation signal range.

Figure 15:
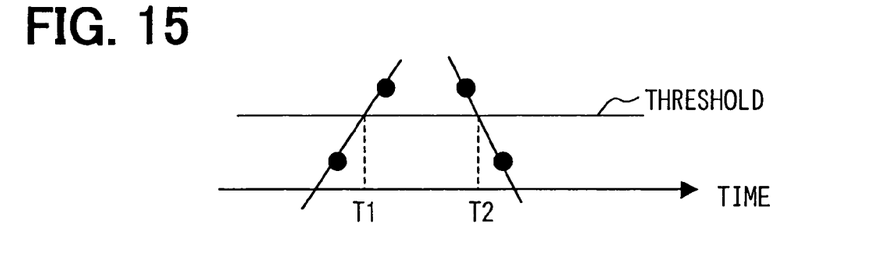
FIG. 15 is an explanatory diagram showing a linear interpolation process according to the embodiment.
Figure 16:
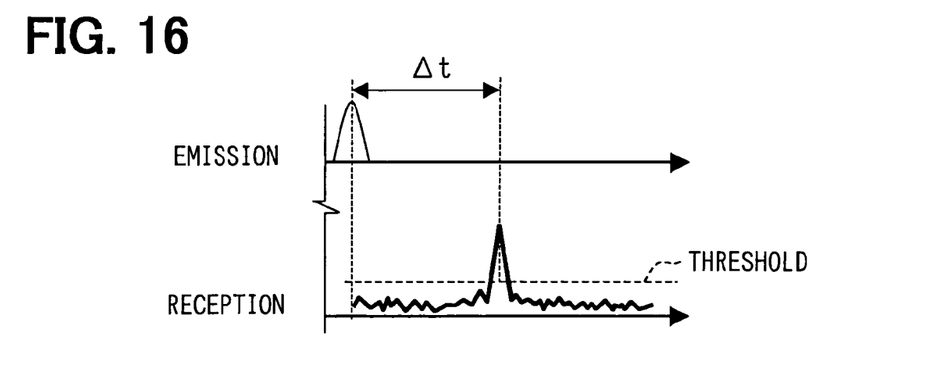
FIG. 16 is an explanatory diagram showing a principal of determination of a distance to an object based on the summation signal according to the embodiment.

The method for setting the threshold will be discussed more in detail. All A/D converted values of the spikes are stored in a RAM and temporarily saved. The maximum intensity value is detected. The threshold is set by multiplying the detected maximum intensity value by the coefficient k, for instance, k=0.5. The A/D converted values stored in the RAM is loaded and each value is compared with the threshold. Two values in a rising section of the spike and in a falling section of the spike on both sides of the threshold are detected, which are indicated with circled points in FIG. 14B. Rising time T1 and falling time T2 at which the spike is estimated to cross a line of the threshold based on the detected values as shown in FIG. 15.

More specifically, the rising time T1 and the falling time T2 are calculated by linear interpolation. When coordinates of the four values are (t1, a1), (t2, a2), (t3, a3), (t4, a4), the rising time T1 and the falling time T2 are calculated by the following equations:

$$T1=(threshold-a1).times.(t2-t1)/(a2-a1)+t1$$

$$T2=(a3-threshold).times.(t4-t3)/(a3-a4)+t3$$

The maximum value of the spikes is hardly distinguished from an electrical noise, which is different from the noise reference signal shown in FIG. 12, when the maximum value is about the same level as the electrical noise. In this case, a noise limit may be set for the threshold to disable the spike detection. The threshold can be set as follows:

Threshold=noise limit, when the maximum intensity.1-toreq.noise limit.times.2

Threshold=the maximum intensity.times.0.5, when the maximum intensity>noise limit.times.2

The noise limit can be set to a constant value in consideration of the electrical noise, or based on an average of intensity levels of the subtraction signal in sections in which the spikes are not present. Furthermore, it can be set based on an average of intensity levels of the subtraction signal in its all sections.

The clock counting block 93 calculates time at which a peak of the spike appears based on the rising time T1 and the falling time T2, namely an average of the rising time T1 and the falling time T2. Then, it calculates a time difference .sub."t between the time of the laser emission and the time of the peak appearance. The time difference .sub."t corresponds to a distance to the object. The calculated time difference .sub."t is outputted to the CPU 60.

The CPU 60 calculates the distance to the object from the time difference .sub."t and produces position data based on the distance and corresponding scan angle .sub."x and .sub."y of the laser beam. More specifically, it sets the center of the laser radar as an origin (0, 0, 0) and calculates X, Y, Z coordinates of the position of the object. The X, Y, Z axes are lined in the side-to-side direction, the vertical direction, and the rear-to-front direction of the vehicle, respectively. The position data is outputted to the ECU 3 as distance measurement data. The scan angle .sub."x used for the calculation is the scan angle .sub."x of a laser beam at the center of the laser beams to which the receipt signals used for the summation correspond.

The ECU 3 recognizes the object based on the distance measurement data received from the radar sensor 5. It outputs driving signals to the brake driving unit 19, the throttle driving unit 21, and the automatic transmission control unit 23 according to a condition of the vehicle in front determined based on the detected object for controlling a vehicle speed. Namely, it performs adaptive cruise control. It also performs an alarm generation determination process when an object is present in an alarm area for a predetermined period. The object includes a vehicle traveling or being parked ahead.

The configurations of the ECU 3 will be discussed. The distance measurement data outputted from the radar sensor 5 is passed to an object recognition block 43. The object recognition block 43 calculates a center position (X, Y, X) of the object and a size of the object (W, D, H) from a width W, a depth D, and a height H based on three dimensional data, which is the distance measurement data. It also calculates a relative speed (Vx, Vy, Vz) of the object with respect to the position of the vehicle based on a variation of the center position over the time. Furthermore, it determines whether the object is standing still or moving based on the vehicle speed outputted from the speed calculation block 47 and the relative speed. If the object is determines as an obstacle to the vehicle based on the above determination and the center position of the object, a distance to the object is displayed on the distance displaying unit 15.

A steering angle calculation block 49 calculates a steering angle based on a signal from the steering angle sensor 27. A yaw rate calculation block 51 calculates a yaw rate based on a signal from the yaw rate sensor 28. A curvature radius calculation block 57 calculates a curvature radius R based on the vehicle speed, the steering angle, and the yaw rate. The object recognition block 43 determines whether the object is possibly a vehicle and traveling in the same lane based on the curvature radius R and the center position (X, Z). The sensor error detection block 44 determines whether the data obtained in the object recognition block 43 is in an abnormal range. If the data is in the abnormal range, an error is indicated by the sensor error displaying unit 17.

A preceding vehicle detection block 53 detects a vehicle ahead based on the data from the object recognition block 43, and calculates a Z-axis distance Z to the vehicle ahead and a relative speed Vz of the vehicle ahead. The ECU 3 determines details of the cruise control based on the distance Z, the relative speed Vz, a setting condition of the cruise control switch 26, a condition of the brake switch 9, and sensitivity settings of the alarm sensitivity setting unit 25. Then, it outputs control signals to the automatic transmission control unit 23, the brake driving unit 19, and the throttle driving unit 21 for implementing necessary control.

An alarm generation determination block 55 determines whether generation of an alarm is required based on the distance Z, the relative speed Vz, a setting condition of the cruise control switch 26, a condition of the brake switch 9, and sensitivity settings of the alarm sensitivity setting unit 25. Then, it outputs an alarm generation signal to the alarm generating unit 13 if the alarm is required. A necessary display signal is outputted to the distance displaying unit 15 for notifying the driver of the conditions when the above controls are implemented.

The present invention should not be limited to the embodiment previously discussed and shown in the figures, but may be implemented in various ways without departing from the spirit of the invention. For example, the photoreception signals to be summed may be photoreception signals corresponding to the laser beams adjacent to each other in the Y-axis direction. The ranges of the laser beams may extend multiple scan lines in the X-axis or the Y-axis direction.

In the above embodiment, the conversion of polar coordinates of the distance and corresponding scan angles .sub."x, .sub."y to XYZ orthogonal coordinates is performed inside the radar sensor 5. It can be performed in the object recognition block 43. Electromagnetic waves, such as millimeter waves, or ultrasonic waves may be used instead of laser beams. Any methods other than the method using scanning may be used for measuring a distance and directions. When a frequency modulated continuous wave (FMCW) radar or a Doppler radar are used as a millimeter wave radar, data on a distance to a vehicle in front and a relative speed of the vehicle in front is obtained at the same time. Therefore, the process of calculating the relative speed based on the distance is not required.

The object detection can be performed based on a single photoreception signal. In this case, the photoreception signal outputted from the photoreceptor in correspondence with the emission of the laser beam at the time when a condition in which no object is present in the scan area is determined is uses as a noise reference signal.

In actual object detection, a noise reference signal corresponding to the laser beam emitted in the same direction with the laser beam for obtaining the received signal is used. By using the noise reference signal, a noise component is properly removed from the received signal at with high accuracy.

The radar sensor 5 can be used in a burglar alarm system for detecting intruders in a predetermined area. In this case, signals from the predetermined area in a normal condition are summed and the summation signal is stored as a noise reference signal. The signals indicate objects exist in the predetermined area. Namely, those signals indicate reflected laser beams from the objects exist in the predetermined area and the result of the summation, which is indicated by the summation signal, indicates the noise reference signal.

The summation signal calculated from received signals matches the noise reference signal as long as locations or shapes of the objects remain the same. A difference between the summation signal and the noise reference signal obtained through a differentiation process is ideally zero. Electrical noises exist in the real world, and therefore the difference does not become zero although it is close to zero.

Figure 17A:
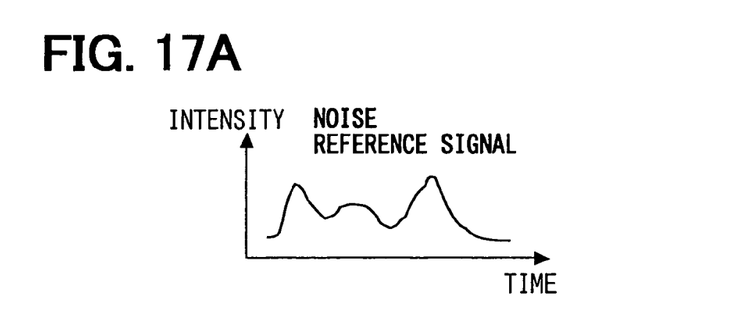
FIG. 17A is a waveform of a noise reference signal according to a modified embodiment of the present invention.
Figure 17B:
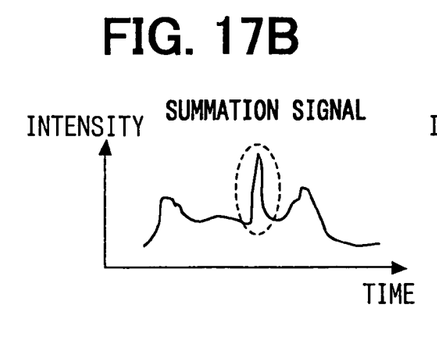
FIG. 17B is a waveform of a summation signal according to the modified embodiment.
Figure 17C:
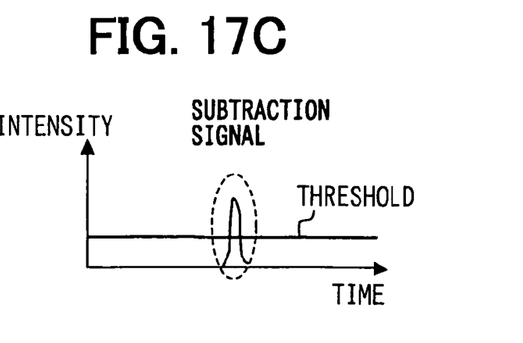
FIG. 17C is a waveform of a subtraction signal according to the modified embodiment.

Referring to FIGS. 17A and 17B, a larger difference is produced between the summation signal and the noise reference signal when a person intrudes into the predetermined area. A spike appears in a subtraction signal obtained through the differentiation process as shown in FIG. 17C. This spike corresponds to a reflected laser beam from the person.

The radar sensor 5 can automatically detects an intruder based on the spikes having amplitude higher than a threshold that is predetermined although a security camera requires a person to monitor images of the camera. The radar sensor 5 can automatically detect presence of an intruder and a distance to the intruder based on the time at which a spike appears. It also determines the direction in which the intruder enters based on emission angles of the laser beams with high angle resolving ability. Thus, a map that shows a track of the intruder can be drawn based on information provided by the radar sensor 5.

What is claimed:

1. A radar device comprising:
    radar means that emits an outgoing wave in a predetermined detection area and outputs a reception signal according to intensity of a reflected wave of the outgoing wave, the reflected wave being reflected by an object;
    determination means that determines a condition in which no object is present in the detection area;
    storing means that stores a noise reception signal corresponding to a noise outputted from the radar means in association with emission of an outgoing wave by the radar means when the condition in which no object is present in the detection area is determined and the outgoing wave is emitted by the radar means;
    differentiation means that calculates a subtraction signal by subtracting the noise reception signal stored by the storing means from the reception signal outputted by the radar means; and
    object detection means that compares the subtraction signal with a predetermined reference value and detects the object reflecting the outgoing wave based on the subtraction signal equal to or larger than the reference value, wherein
    the object detection means further includes an analog-to-digital (A/D) conversion means,
    the radar means emits a plurality of outgoing waves in different directions in the detection area, and
    the radar device further comprises:
        summation range specification means that determines a plurality of summation ranges by specifying a number of reception signals corresponding to a number of outgoing waves emitted adjacent to each other and by shifting adjacent summation ranges by a number of reception signals smaller than the specified number of reception signals such that some of the reception signals are included in a plurality of the summation ranges; and
        summation means that sums summation signals converted by the A/D conversion means from the reception signals for each range determined by the summation range specification means, wherein
    the storing means stores a noise component of each summation signal;
    the differentiation means calculates the subtraction signal by subtracting the noise component from the summation signal, and
    the object detection means sets a reference value in a range lower than a peak value of the subtraction signal, and detects an object based on a comparison between the subtraction signal and the reference value.

2. The radar device according to claim 1, wherein:
    the storing means stores each noise reception signal outputted from the radar means in response to corresponding emission of the outgoing waves;
    the differentiation means uses the noise reception signal that corresponds to the outgoing wave emitted in the same direction as a source outgoing wave of the reception signal that is under the calculation for subtracting the noise reception signal from the outgoing signal.

3. The radar device according to claim 1, wherein the determination means determines the condition in which no object is present in the detection area when a shape of the reception signal matches a waveform that indicates a condition in which no object is present in the detection area.

4. The radar device according to claim 1, wherein the determination means determines the condition in which no object is present in the detection area when a shape of the reception signal matches a waveform that indicates a condition in which no object is present in the detection area.

5. The radar device according to claim 1, wherein the storing means updates the noise reception signal every time when the condition in which no object is present in the detection area is determined by the determination means.

6. A radar device for a vehicle comprising:

radar means that emits an outgoing wave in a predetermined detection area located ahead of the vehicle and outputs a reception signal corresponding to intensity of a reflected wave of the outgoing wave, the reflected wave being reflected by an object;

determination means that determines a condition in which no object is present in the detection area;

storing means that stores a noise reception signal corresponding to a noise outputted from the radar means in association with emission of an outgoing wave by the radar means when the condition in which no object is present in the detection area is determined and the outgoing wave is emitted by the radar means;

differentiation means that calculates a subtraction signal by subtracting the noise reception signal stored by the storing means from the reception signal outputted by the radar means; and object detection means that compares the subtraction signal with a predetermined reference value and detects the object reflecting the outgoing wave based on the subtraction signal equal to or larger than the reference value, wherein the object detection means further includes an analog-to-digital (A/D) conversion means, the radar means emits a plurality of outgoing waves in different directions in the detection area, and the radar device further comprises:

summation range specification means that determines a plurality of summation ranges by specifying a number of reception signals corresponding to a number of outgoing waves emitted adjacent to each other and by shifting adjacent summation ranges by a number of reception signals smaller than the specified number of reception signals such that some of the reception signals are included in a plurality of the summation ranges; and summation means that sums summation signals converted by the A/D conversion means from the reception signals for each range determined by the summation range specification means, wherein the storing means stores a noise component of each summation signal;

the differentiation means calculates the subtraction signal by subtracting the noise component from the summation signal, and the object detection means sets a reference value in a range lower than a peak value of the subtraction signal, and detects an object based on a comparison between the subtraction signal and the reference value.

7. The radar device according to claim 6, wherein:

the storing means stores each noise reception signal outputted from the radar means at each emission of the outgoing waves;

the differentiation means uses the noise reception signal that corresponds to the outgoing wave emitted in the same direction as the outgoing wave that is a source wave of the reception signal under the calculation for subtracting the noise reception signal from the outgoing signal.

8. The radar device according to claim 6, wherein the determination means determines the condition in which no object is present in the detection area when a shape of the reception signal match a specific pattern obtained in a condition that no object is present in the detection area.

9. The radar device according to claim 6, wherein the determination means determines the condition in which no object is present in the detection area when a shape of the summation signal match a specific pattern obtained in a condition that no object is present in the detection area.

10. The radar device according to claim 6, wherein the storing means updates data on the noise reception signal by every time when the condition in which no object is present in the detection area is determined by the determination means.

* * * * *

UNITED STATES PATENT AND TRADEMARK OFFICE
CERTIFICATE OF CORRECTION

PATENT NO.       : 7,602,477 B2          Page 1 of 1
APPLICATION NO. : 11/076294
DATED            : October 13, 2009
INVENTOR(S)      : Nakamura et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 670 days.

Signed and Sealed this

Fifth Day of October, 2010

David J. Kappos
*Director of the United States Patent and Trademark Office*